US006855193B2

(12) United States Patent
Andrievsky et al.

(10) Patent No.: US 6,855,193 B2
(45) Date of Patent: Feb. 15, 2005

(54) INK JET INK COMPOSITION

(75) Inventors: Andrei Andrievsky, Webster, NY (US); David T. Southby, Rochester, NY (US); Steven Evans, Rochester, NY (US); Dale E. Decann, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 92 days.

(21) Appl. No.: 10/231,836

(22) Filed: Aug. 30, 2002

(65) Prior Publication Data

US 2004/0050290 A1 Mar. 18, 2004

(51) Int. Cl.$^7$ .............................................. C09D 11/02
(52) U.S. Cl. ............................ 106/31.27; 106/31.43; 106/31.44; 106/31.47; 106/31.49; 106/31.6; 106/31.75; 106/31.77; 106/31.78
(58) Field of Search ...................... 106/31.27, 31.43, 106/31.44, 31.47, 31.49, 31.6, 31.75, 31.77, 31.78

(56) References Cited

U.S. PATENT DOCUMENTS

| 4,732,615 A | | 3/1988 | Kawashita et al. ...... 106/31.46 |
| 5,368,641 A | | 11/1994 | Dietz et al. ................. 106/495 |
| 5,571,311 A | * | 11/1996 | Belmont et al. ......... 106/31.28 |
| 5,630,868 A | * | 5/1997 | Belmont et al. ......... 106/31.75 |
| 5,707,432 A | * | 1/1998 | Adams et al. ............. 106/31.6 |
| 5,830,265 A | * | 11/1998 | Tsang et al. ............. 106/31.75 |
| 5,922,118 A | | 7/1999 | Johnson et al. ............ 106/31.6 |
| 5,994,427 A | | 11/1999 | Kappele et al. ............. 523/160 |
| 6,066,203 A | | 5/2000 | Badejo et al. .............. 106/497 |
| 6,152,968 A | * | 11/2000 | Etzbach et al. ................ 8/638 |
| 2003/0209166 A1 | * | 11/2003 | Vanmaele et al. ....... 106/31.27 |

FOREIGN PATENT DOCUMENTS

| EP | 0559309 A2 | 3/1988 |
| EP | 0 904 327 | 8/2001 |
| EP | 1 146094 | 10/2001 |
| WO | WO 97/47699 | 12/1997 |

* cited by examiner

*Primary Examiner*—Helene Klemanski
(74) *Attorney, Agent, or Firm*—Harold E. Cole; Chris P. Konkol

(57) ABSTRACT

An ink jet ink composition of water, humectant and a self-assembling colorant that is capable of spontaneously forming a nanoparticulate dispersion without any prior physical attrition or surface modification, the colorant having the formula: $(A)_m$—Q—$(Z)_n$ wherein: Q represents a chromophore; each A independently represents an organic or inorganic group capable of hydrogen bonding or other non-covalent bonding; each Z independently represents an organic or inorganic group capable of electrostatic bonding; and m and n each independently represents an integer from 0 to 10; with the proviso that n+m is at least 1; and with the further proviso that at least about 50 wt. % of the colorant is present in the composition as particles.

11 Claims, No Drawings

INK JET INK COMPOSITION

CROSS REFERENCE TO RELATED APPLICATIONS

Reference is made to commonly assigned, co-pending U.S. patent applications:

Ser. No. 10/231,837 by Andrievsky et al., filed concurrently herewith entitled "Ink Jet Printing Process";

Ser. No. 10/232,035 by Andrievsky et al., filed concurrently herewith entitled "Ink Jet Ink Composition"; and Ser. No. 10/232,058 by Andrievsky et al., filed concurrently herewith entitled "Ink Jet Printing Process".

FIELD OF THE INVENTION

This invention relates to an ink jet ink composition for improving the ozone and light stability of an ink jet image.

BACKGROUND OF THE INVENTION

Ink jet printing is a non-impact method for producing images by the deposition of ink droplets in a pixel-by-pixel manner to an image-recording element in response to digital signals. There are various methods that may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant that is molecularly dispersed or solvated by a carrier medium. The carrier medium can be a liquid or a solid at room temperature. A commonly used carrier medium is water or a mixture of water and organic co-solvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor light-fastness. When water is used as the carrier medium, such inks also generally suffer from poor water-fastness.

A pigment is a colorant that is insoluble in the carrier medium, but is dispersed or suspended in the form of small particles, often stabilized against flocculation and settling by the use of dispersing agents. Many such compounds are known and are commercially used. Color Index International (publication by the Society of Dyers and Colorists, 1997) lists various classes of pigments. It is common practice to produce pigment compositions in the form of finely divided dispersions, which may be generated by well-known methods such as ball milling. In order to obtain the optimum dispersion properties it is common to have present at least one dispersant, and the choice of dispersant is important for achieving acceptable pigment dispersion properties. The purpose of the dispersant is to stabilize the particles and to prevent growth by aggregation and flocculation. However, merely adsorbing a dispersant to the pigment surface may lead to competition for such dispersant from solvents and humectants used in the ink formulation and may lead to desorption. In general, such systems may also suffer from a dependence on the concentration of the pigment, the type of humectants used, and the temperature and pH of the formulation containing the pigment. Therefore, it is often difficult to identify an acceptable dispersant which provides the needed ink stability and is compatible with other components in the ink formulation.

Images obtained from pigment-based inks generally have better light-fastness and ozone-fastness than that of the images obtained from dye-based inks. It is especially true when these are used with a recording element containing a porous image-receiving layer. However, pigment based inks have not received a wide degree of acceptance in ink jet ink systems, because of problems associated with the preparation, performance and reliability of the composition, such as dispersability, print properties, dispersion stability, latency, smear, and gloss.

When a pigment-based ink is formulated, a dispersant is normally used along with a milling or physical grinding step. Alternatively, after milling, the pigment surface may be chemically modified to render the particles dispersible in an aqueous formulation. However, there is a problem with these techniques in that they take time and are expensive. It would be desirable to find alternative colorants having the image permanence of pigments but which do not require milling.

U.S. Pat. No. 5,922,118, EPA 0904327, and WO9747699 disclose surface-modified pigments, wherein such surface modification comprises ionic or ionizable groups for improvement of pigment dispersability. However, these pigments still require a milling step.

EP 1146094 describes pigment compositions for paints and inks consisting of mixtures of salts of quinacridone monosulfonic acids and quinacridone pigments. The quinacridone monosulfonic acid derivatives of this reference are not water-soluble and the pigment compositions require mechanical milling to achieve acceptable dispersions.

U.S. Pat. Nos. 6,066,203 and 5,368,641 describe mono- and bis-sulfamoyl ($-SO_2NRR'$) derivatives (respectively) of quinacridones for use in formulating quinacridone pigment dispersions similar to those described in EP1146094 above.

It is an object of the invention to provide an ink jet ink composition that employs self-dispersed particles, which do not require milling or grinding and do not require the use of a dispersant.

SUMMARY OF THE INVENTION

This and other objects are achieved in accordance with the present invention which comprises an ink jet ink composition comprising water, humectant and a self-assembling colorant that is capable of spontaneously forming a nano-particulate dispersion without any prior physical attrition or surface modification, the colorant having the formula:

$(A)_m\text{—}Q\text{—}(Z)_n$ wherein:
- Q represents a chromophore;
- each A independently represents an organic or inorganic group capable of hydrogen bonding or other non-covalent bonding;
- each Z independently represents an organic or inorganic group capable of electrostatic bonding; and
- m and n each independently represents an integer from 0 to 10;
- with the proviso that n+m is at least 1; and with the further proviso that at least about 50 wt. % of the colorant is present in the composition as particles.

It was found that the stability to atmospheric pollutants and to light of an ink jet image was improved using the compositions described herein.

DETAILED DESCRIPTION OF THE INVENTION

The chromophore (Q) of the colorant of the invention may be chosen from any of the commonly used dye and pigment chromophoric classes. In particular, those classes that are capable of self-assembling through strong intermolecular non-covalent associative forces such as electrostatic bonding, van der Waals interactions, hydrogen bonding, hydrophobic interactions, dipole-dipole interactions, dipole-induced dipole interactions, London dispersion forces, cation—π interactions, etc. are especially preferred. Self-assembly is a process of reversible, spontaneous formation of polymolecular aggregates from self-complementary and mutually-complimentary components. Examples of such classes include the following chromophores: metal and metal-free phthalocyanines; anthraquinones; naphthoquinones; quinacridones; quinophthalones; indigos; thioindigos; perylenes; dioxazines; 1,4-diketopyrrolopyrroles; anthrapyridines; anthrapyrimidines; anthanthrones; flavanthrones; indanthrones; isoindolines; isoindolinones; perinones; pyranthrones; porphyrins and azo compounds.

In a preferred embodiment of the invention, the colorant is substituted with a mixture of organic or inorganic water-solubilizing group or groups capable of electrostatic bonding (Z) and/or organic or inorganic hydrophilic non-ionic groups capable of hydrogen bonding or other non-covalent bonding (A) in such a ratio that the colorant spontaneously forms a nanoparticulate dispersion in an aqueous carrier liquid without prior attritive milling or other high-energy dispersing techniques or prior surface modification. The ionic water-solubilizing groups (Z) may be anionic, such as sulfonate, sulfinate, phosphonate or carboxylate; or cationic such as ammonium, substituted ammonium, pyridinium, amidinium or guanidinium. The non-ionic, hydrophilic groups (A) may be hydroxy groups, sugar residues, polyoxyalkylene groups such as poly(ethyleneoxide), sulfamoyl or carbamoyl groups and their mono- and di-substituted derivatives, heterocyclic moieties such as tetrahydrofuran, imidazole and the like, or alkylsulfonyl groups.

In a particularly preferred embodiment, the ionic water-solubilizing groups (Z) are sulfonate groups and non-ionic hydrophilic groups (A) are mono- or di-substituted sulfamoyl groups.

Particularly preferred colorant classes are the phthalocyanines and quinacridones with the following formulas:

Phthalocyanine-$MPc(SO_3X)_a(SO_2NRR')_b$ wherein:
- M represents a metal;
- Pc represents a phthalocyanine nucleus;
- X represents hydrogen, alkali metal or an organic cation, such as Na, Li, or ammonium;
- a is from 0 to 3;
- R represents a substituted or unsubstituted alkyl group having from 1 to about 15 carbon atoms, a substituted or unsubstituted aryl group, or a substituted or unsubstituted heterocyclic group;
- R' represents R or hydrogen;

with the proviso that a+b is an average of from 2 to 4;

In an especially preferred embodiment of the invention, R in the above formula represents a substituted or unsubstituted alkyl group having from 1 to about 15 carbon atoms containing a hydroxy group, a substituted or unsubstituted aryl group containing a hydroxy group or a substituted or unsubstituted heterocyclic group containing a hydroxy group. In another preferred embodiment, M in the above formula represents copper, nickel, aluminum, zinc, iron, or cobalt. In another preferred embodiment, R in the above formula represents $CH_2CH_2OH$. In another preferred embodiment, M represents Cu or Ni and R is $CH_2CH_2OH$.

Quinacridone wherein:
- each $R_1$ independently represents an alkyl group of from 1 to about 6 carbons; an alkoxy group of from 1 to about 6 carbons; an alkoxycarbonyl group of from 1 to about 6 carbons; halogen; cyano; nitro; carbamoyl; an alkylcarbamoyl group of from 1 to about 6 carbons; or a dialkylcarbamoyl group of from 1 to about 6 carbons;
- $R_2$ and $R_3$ independently represent H or an alkyl group of from 1 to about 6 carbons, optionally substituted with one or more groups chosen from hydroxy, amino, dialkylamino, alkoxy, halogen, nitro, cyano, alkoxycarbonyl and acyloxy.
- $R_2$ and $R_3$ may also be combined to form a 5- to 7-membered heterocyclic ring;
- $Y^+$ represents hydrogen, an alkali metal, ammonium, alkylammonium, diallcylammonium, trialkylammonium, tetralkylammonium, pyridinium or a substituted pyridinium; and
- x represents an integer from 0 to 4;

In another preferred embodiment, at least about 70 wt. %, more preferably 80 wt. % of the colorant is present in the composition as particles. In another preferred embodiment, the particles are less than about 0.3 μm, more preferably less than about 0.1 μm in size.

In another preferred embodiment of the invention, the metallized, phthalocyanine colorants that may be used include the following:

TABLE 1a

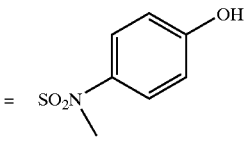

| Colorant | M  | $Z_1$ | $Z_2$ | $Z_3$ | $Z_4$ | Substitution |
|----------|----|-------|-------|-------|-------|--------------|
| 1        | Cu | DA    | DA    | DA    | DA    | 4, 4', 4", 4''' |
| 2        | Cu | SX    | DA    | DA    | DA    | 4, 4', 4", 4''' |
| 3        | Cu | SX    | SX    | DA    | DA    | 4, 4', 4", 4''' |
| 4        | Cu | SX    | SX    | SX    | DA    | 4, 4', 4", 4''' |
| 5        | Cu | DA    | DA    | DA    | DA    | random       |
| 6        | Cu | SX    | DA    | DA    | DA    | random       |
| 7        | Cu | SX    | SX    | DA    | DA    | random       |
| 8        | Cu | SX    | SX    | SX    | DA    | random       |
| 9        | Cu | DA    | DA    | DA    | N/S   | random       |
| 10       | Cu | SX    | DA    | DA    | N/S   | random       |
| 11       | Cu | SX    | SX    | DA    | N/S   | random       |
| 12       | Cu | DA    | DA    | N/S   | N/S   | random       |
| 13       | Cu | SX    | DA    | N/S   | N/S   | random       |
| 14       | Ni | DA    | DA    | DA    | DA    | 4, 4', 4", 4''' |
| 15       | Ni | SX    | DA    | DA    | DA    | 4, 4', 4", 4''' |
| 16       | Ni | SX    | SX    | DA    | DA    | 4, 4', 4", 4''' |
| 17       | Ni | SX    | SX    | SX    | DA    | 4, 4', 4", 4''' |
| 18       | Cu | EA    | EA    | EA    | EA    | 4, 4', 4", 4''' |
| 19       | Cu | SEA   | BA    | BA    | BA    | random       |
| 20       | Ni | SEA   | SEA   | BA    | BA    | 4, 4', 4", 4''' |
| 21       | Ni | SEA   | SEA   | SEA   | EA    | random       |
| 22       | Cu | EA    | EA    | EA    | DA    | 4, 4', 4", 4''' |
| 23       | Cu | SEA   | EA    | EA    | DA    | random       |
| 24       | Ni | SEA   | SEA   | EA    | EA    | 4, 4', 4", 4''' |
| 25       | Co | SEA   | SEA   | SEA   | EA    | random       |
| 26       | Cu | DA    | DA    | EA    | N/S   | random       |
| 27       | Cu | SX    | DA    | EA    | N/S   | random       |
| 28       | Cu | SX    | SEA   | DA    | N/S   | random       |
| 29       | Cu | DA    | EA    | N/S   | N/S   | random       |
| 30       | Ni | SX    | DA    | N/S   | N/S   | random       |
| 31       | Cu | SPY   | SPY   | SPY   | SNa   | random       |
| 32       | Cu | SPY   | SPY   | SPH   | SNa   | random       |
| 33       | Ni | SPY   | SPY   | SNa   | SNa   | random       |
| 34       | Ni | SPY   | SPY   | SPH   | SNa   | random       |
| 35       | Cu | SPY   | SPY   | SPH   | SNa   | 4, 4', 4", 4''' |
| 36       | Ni | SPY   | SPY   | SPH   | SNa   | 4, 4', 4", 4''' |

Where:

$SX = SO_3^- H_2N^+(CH_2CH_2OH)_2$;

$DA = SO_2N(CH_2CH_2OH)_2$;

$EA = SO_2NHCH_2CH_2OH$;

$SEA = SO_3^- H_3N^+CH_2CH_2OH$;

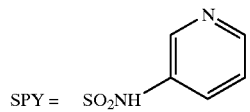

$SPH = $ 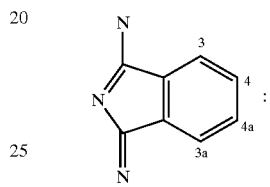

$SNa = SO_3^- Na^+$

N/S = no substituent.

Electrophilic substitution or construction of the phthalocyanine nucleus leads to a mixture of products. In each aromatic ring, as shown in the generalized structure below, substitution may occur at one of the 4 or 4a positions, which are equivalent, or at one of the 3 or 3a positions, which are equivalent.

Numbering of position of substitution

The descriptors in Table 1a, 'Substitution' column have the following meanings: 4, 4', 4", 4''': substitution occurred to give one substituent in each aromatic ring at a 4 or 4a position; random: where substitution occurred, the substituent is present in one of the 3, 4, 4a or 3a positions in each aromatic ring.

Colorant A Composition is predominantly a mixture of Colorants 1–4 and includes positional isomers of Colorants 1–4;

Colorant B Composition is predominantly a mixture of Colorants 5–13 and includes positional isomers of Colorants 5–13;

Colorant C Composition is predominantly a mixture of Colorants 14–17 and includes positional isomers of Colorants 14–17.

In another preferred embodiment of the invention, the quinacridone colorants that may be used include the following:

TABLE 1b

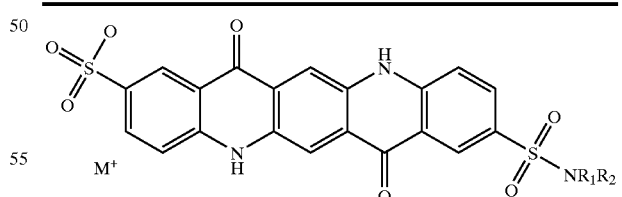

| Colorant | $M^+$ | $R_1$ | $R_2$ |
|----------|-------|-------|-------|
| 37 | $H_2N^+(C_2H_4OH)_2$ | $C_2H_4OH$ | $C_2H_4OH$ |
| 38 | $H_3N^+C_2H_4OH$ | H | $C_2H_4OH$ |
| 39 | $Na^+$ | $CH_3$ | $C_2H_4OH$ |
| 40 | $N^+(CH_3)_4$ | H | $CH_2CH(OH)CH_2OH$ |
| 41 | $Na^+$ | $CH_3$ | $CH_3$ |
| 42 | $Na^+$ | H | $C_3H_6N(CH_3)_2$ |
| 43 | $Na^+$ | $C_2H_4CO_2CH_3$ | $C_2H_4CO_2CH_3$ |

TABLE 1b-continued

[Structure: sulfonated quinacridone-type compound with M+ and NR₁R₂ substituents]

| Colorant | M+ | R₁ | R₂ |
|---|---|---|---|
| 44 | Na+ | H | CH₂[CH(OH)]₄CH₂OH |
| 45 | NH₄+ | H | H |
| 46 | Na+ | C₂H₄CONHCH₃ | C₂H₄CONHCH₃ |
| 47 | H₂N+(morpholine) | | —C₂H₄OC₂H₄— |
| 48 | H₂N+(pyrrolidine) | | —C₄H₈— |

49 [Structure with Cl substituents, SO₂N(C₂H₄OH)₂, H₂N+(C₂H₄OH)₂]

50 [Structure with H₃C, CH₃ substituents, SO₂N(C₂H₄OH)₂, H₂N+(C₂H₄OH)₂]

Colorant D Composition is predominantly Colorant 37

The colorants described above may be employed in any amount effective for the intended purpose. In general, good results have been obtained when the colorant is present in an amount of from about 0.2 to about 10 wt. %, the humectant is present in an amount of from about 5 to about 70 wt. %, and the balance is water. A dye may also be added to the ink jet ink composition if desired.

The support for the ink jet recording element used in the invention can be any of those usually used for ink jet receivers, such as paper, resin-coated paper, plastics such as a polyester-type resin such as poly(ethylene terephthalate), polycarbonate resins, polysulfone resins, methacrylic resins, cellophane, acetate plastics, cellulose diacetate, cellulose triacetate, vinyl chloride resins, poly(ethylene naphthalate), polyester diacetate, various glass materials, and microporous materials such as microvoided polyester described in copending U.S. Ser. No. 09/656,129, filed Aug. 29, 2000, polyethylene polymer-containing material sold by PPG Industries, Inc., Pittsburgh, Pa. under the trade name of Teslin®, Tyvek® synthetic paper (DuPont Corp.), and OPPalyte® films (Mobil Chemical Co.) and other composite films listed in U.S. Pat. No. 5,244,861. The thickness of the support employed in the invention can be, for example, from about 12 to about 500 $\mu$m, preferably from about 75 to about 300 $\mu$m.

Antioxidants, antistatic agents, plasticizers and other known additives may be incorporated into the support, if desired. In a preferred embodiment, paper is employed.

In a preferred embodiment of the invention, the ink-receiving layer is porous and contains inorganic particles such as silica, alumina, titanium dioxide, clay, calcium carbonate, barium sulfate, or zinc oxide. In another preferred embodiment, the porous ink-receiving layer comprises from about 20 wt. % to about 95 wt. % inorganic particles, preferably at least 30 wt. %, and from about 5 wt. % to about 80 wt. %, preferably not more than 70 wt. %, of polymeric binder, such as gelatin, poly(vinyl alcohol), poly(vinyl pyrrolidinone) or poly(vinyl acetate). The porous ink-receiving layer can also contain organic beads or polymeric micro-porous structures without inorganic filler particles as shown in U.S. Pat. Nos. 5,374,475 and 4,954,395, the disclosures of which are hereby incorporated by reference.

Examples of binders which may be used in the image-receiving layer include polyvinyl alcohol, polyvinyl pyrrolidone, poly(ethyl oxazoline), non-deionized or deionized Type IV bone gelatin, acid processed ossein gelatin or pig skin gelatin. The hydrophilic polymer may be present in an amount of from about 0.4 to about 30 g/m², preferably from about 1 to about 16 g/m².

The pH of the aqueous ink compositions of the invention may be adjusted by the addition of organic or inorganic acids or bases. Useful inks may have a preferred pH of from about 2 to 9, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethylenediamine.

One or more humectants are employed in the ink jet composition of the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2, 6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. Preferred humectants for the composition of the invention are diethylene glycol, glycerol, and diethylene glycol monobutylether.

Water-miscible organic solvents may also be added to the aqueous ink of the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic. A preferred surfactant for the ink composition of the present invention is Surfynol® 465 (Air Products) at a final concentration of 0.1% to 1.0%.

A biocide may be added to the composition of the invention to suppress the growth of micro-organisms such as molds, fungi, etc. in aqueous inks. A preferred biocide for the ink composition of the present invention is Proxel® GXL (Zeneca Specialties Co.) at a final concentration of 0.05–0.5 wt. %.

A typical ink composition of the invention may comprise, for example, the following substituents by weight: colorant (0.2–5%), water (20–95%), humectant (5–70%), water miscible co-solvents (2–20%), surfactant (0.1–10%), biocide (0.05–5%) and pH control agents (0.1–10%).

Additional additives which may optionally be present in the ink jet ink composition of the invention include thickeners, conductivity enhancing agents, anti-kogation agents, drying agents, and defoamers.

The image-recording layer used in a process employing the composition of the present invention can also contain various known additives, including matting agents such as titanium dioxide, zinc oxide, silica and polymeric beads such as crosslinked poly(methyl methacrylate) or polystyrene beads for the purposes of contributing to the non-blocking characteristics and to control the smudge resistance thereof; surfactants such as non-ionic, hydrocarbon or fluorocarbon surfactants or cationic surfactants, such as quaternary ammonium salts; fluorescent dyes; pH controllers; anti-foaming agents; lubricants; preservatives; viscosity modifiers; dye-fixing agents; waterproofing agents; dispersing agents; UV-absorbing agents; mildew-proofing agents; mordants; antistatic agents, anti-oxidants, optical brighteners, and the like. A hardener may also be added to the ink-receiving layer if desired.

In order to improve the adhesion of the image-recording layer to the support, the surface of the support may be subjected to a treatment such as a corona-discharge-treatment prior to applying the image-recording layer.

In addition, a subbing layer, such as a layer formed from a halogenated phenol or a partially hydrolyzed vinyl chloride-vinyl acetate copolymer can be applied to the surface of the support to increase adhesion of the image recording layer. If a subbing layer is used, it should have a thickness (i.e., a dry coat thickness) of less than about 2 $\mu$m.

The image-recording layer may be present in any amount which is effective for the intended purpose. In general, good results are obtained when it is present in an amount of from about 2 to about 46 g/m$^2$, preferably from about 6 to about 16 g/m$^2$, which corresponds to a dry thickness of about 2 to about 42 $\mu$m, preferably about 6 to about 15 $\mu$m.

The following examples are provided to illustrate the invention.

EXAMPLES

Synthesis of Colorant A Composition

Colorant A Composition was prepared from Copper (II) phthalocyanine 4,4',4",4'''-tetrasulfonic acid or its salts which was made according to JP00303009A.

Copper (II) phthalocyanine 4,4',4",4'''-tetrasulfonic acid (5 g) was suspended in sulfolane (100 ml), and thionyl chloride (100 ml) was added all at once followed by dimethylformamide (0.5 g). The mixture was refluxed for 48 hours, insolubles were filtered off and discarded, and excess thionyl chloride was evaporated using a rotary evaporator. Diethanolamine (19 g) was then added while stirring and keeping the reaction temperature between 45 and 55° C. After stirring for 2 hours at 55° C., diisopropyl ether (250 ml) was added to the resulting reaction mixture, and stirring was continued for 2 hours at ambient temperature. The colorless layer was decanted, and isopropyl alcohol (250 ml) was added. The mixture was stirred for 6 hrs at ambient temperature. The precipitate was filtered, washed with ethanol (200 ml) at 70° C. and dried in vacuo to give Colorant A Composition (4.3 g).

Synthesis of Colorant B Composition

Colorant B Composition was made the same as Colorant A Composition except Direct Blue 199, sulfonated copper phthalocyanine dye, obtained by freeze drying an aqueous solution available from Tricon, Inc. was used as the starting material.

Synthesis of Colorant C Composition

Colorant C Composition was made the same as Colorant A Composition except Nickel (II) phthalocyanine 4,4',4", 4'''-tetrasulfonic acid was used as the starting material.

Synthesis of Colorant D Composition 10 g of quinacridone (PV Fast Red ESB available from Clariant Corporation) was added in portions to 100 g of chlorosulfonic acid at <15° C. under a nitrogen atmosphere. The resulting purple solution was heated in an 80° C. oil bath for 3 hours, 5 mL thionyl chloride was added and heating continued at 80° C. for 2 more hours. The reaction mixture was transferred to a rotary evaporator and the volatiles removed at 50° C. The residue was cooled to room temperature and slowly added to 400 g of ice with good mixing. The resulting red-orange solid was collected by filtration and rinsed with cold water. The solid cake was allowed to air-dry overnight, ground with a mortar and pestle, slurried with acetone and filtered to yield crude quinacridone bis-sulfonyl chloride.

10 g of the crude sulfonyl chloride from above was added in portions to a solution of 9.2 g diethanolamine in 100 mL DMF at <15° C. The resulting suspension was stirred at ambient temperature for 3 hours and added to 400 mL methanol with stirring. The solid product was collected by filtration and rinsed with methanol. The methanol-DMF soluble fraction is mainly quinacridone bis-sulfonate. The crude product was further purified by re-suspension in 50 mL warm DMF, dilution with 100 mL methanol, cooling to room temperature and filtration. The solid was ground with a mortar and pestle and slurried in acetonitrile to yield 10.2 g of a red-orange solid. Mass spectral and HPLC analyses indicated that the product was predominately Colorant 37, with traces of bis-sulfonate and bis-(diethanolsulfonamide) products.

Receiving Elements

The following commercially-available receiving elements with a porous image-receiving layer were used:

Receiving Element 1

Kodak Professional Inkjet Products, Instant-Dry Photographic Glossy Paper, CAT 8987752.

Receiving Element 2

Konica Photo Quality Ink Jet Paper QP, No: KJP-LT-GH-15-QP PI.

Ink Preparation

Inks were formulated to give a maximum density of approximately 1.2–1.4, when printed onto the above receiving elements using a Lexmark Z51®, thermal head printer. The concentration of colorants in the formulation could be adjusted to achieve other levels of coverage. Inks for printing via a Piezo head using a Mutoh 4100® wide format printer are described hereinafter.

Thermal Cyan Ink Formulations

1) Ink from Colorant C Composition

Colorant C Composition (0.338 g) was stirred overnight with water (2 g) and a solution (5 g) containing glycerol (37% by weight), diethylene glycol (12.5%), and butoxytriglycol (14%) in water (to 100%). Once no solids remained, a further quantity of water (2.66 g) was added to generate 10 g of ink. This ink was filtered through a 0.45 μm polytetrafluoroethylene filter pad then loaded into a Lexmark cartridge to be printed using a Lexmark Z51® printer.

2) Ink from Colorant C Composition/Direct Blue 199 (Tricon, Inc. Green Shade 1837-P) Mixture 10 g sample of ink was prepared similar to 1) from Colorant C Composition (0.169 g) and DB-199 concentrate (1.171 g).

3) Ink from Colorant A Composition 10 g sample of ink was prepared similar to 1) from Colorant A Composition (0.21 g) to print to a maximum density of approximately 1.0.

4) Ink from Colorant B Composition 10 g sample of ink was prepared similar to 1) from Colorant B Composition (0.21 g) to print to a maximum density of approximately 1.0.

C-1 Comparison Ink from Direct Blue 199 (Tricon, Inc. Green Shade 1837-P)

10 g sample of ink was prepared similar to 1) from the dye aqueous DB-199 concentrate (2.342 g).

C-2 Comparison Ink from Avecia Pro-Jet™ Fast Cyan 2 (Liquid)

10 g sample of ink was prepared similar to 1) from the dye aqueous concentrate (1.523 g).

C-3 Ink from Bayer Bayscript Cyan BA™

10 g sample of ink was prepared similar to 1) from the dye aqueous concentrate (0.9 g).

Piezo Light Cyan Ink Formulations

These were prepared to have viscosity in the range of 2.8–3.0 cp and were adjusted to a pH of about 8.1.

5) Ink from Colorant A Composition

For 80 g of ink, Colorant A Composition (1.6 g) was stirred overnight with a mixture of glycerol (3.44 g), diethylene glycol (6.8 g), butoxytriglycol (6.4 g), 2-pyrrolidinone (3.44 g) and water (58.32 g). The pH of the mixture was measured and adjusted to pH=8.18 by careful addition of a dilute solution of triethanolamine. The mixture was filtered through a 0.45 μm polytetrafluoroethylene filter pad then loaded ready for printing using a Mutoh 4100®, wide format printer.

6) Ink from Colorant B Composition

This ink was prepared the same as 5) above except using the dye (1.6 g), glycerol (8.0 g), diethylene glycol (8.0 g), butoxytriglycol (6.4 g), and water (56.0 g).

C-4 Comparison Ink from Avecia Pro-Jet™ Fast Cyan 2 (Liquid)

This ink was prepared the same as 5) above except using the dye concentrate (6% dye, 16 g), glycerol (9.4 g), diethylene glycol (10.8 g), butoxytriglycol (5.6 g), and water (38.2 g).

Thermal Magenta Ink Formulations

7) Ink from Colorant D Composition

Colorant D Composition (0.817 g) was stirred overnight with water (2 g) and a solution (5 g) containing tetraethylene glycol (30% by weight), 2-pyrrolidinone (16%), and 1,2-hexanediol (14%) in water (to 100%). A further quantity of water (1.68 g) and triethanolamine (0.5 g) were added to generate 10 g of ink. This ink was filtered through a 0.45 μm polytetrafluoroethylene filter pad then loaded into a Lexmark cartridge to be printed using a Lexmark Z51® printer.

C-5 Comparison Ink from Ex. 2 of U.S. Pat. No. 6,152,968 (Structure Shown Below)

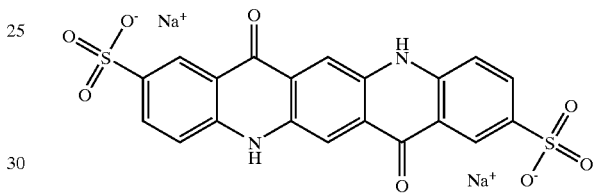

10 g sample of ink was prepared similar to 7) from this colorant (0.937 g), water (2 g+1.56 g), triethanolamine (0.5 g) and a solution (5 g) containing tetraethylene glycol (30% by weight), 2-pyrrolidinone (16%), and 1,2-hexanediol (14%) in water (to 100%).

Evaluation

Various test targets were printed, using two ink jet receiving elements, to allow examination of several density level patches (approx 10 mm square) ranging from 100% dot coverage to less than 25% dot coverage. Printed samples were then subjected to image stability testing under a variety of conditions. These tests are described below. Typically the Status A red (for cyans) or green (for magentas) reflection density of the 100% and 75% dot coverage (or other) patches on a fresh sample were measured using an X-Rite 820® densitometer, corrected for the color of the receiver, and recorded. That sample was subjected to a test described below and re-read. The percentage of dye density remaining relative to the fresh sample was calculated, to give a measure of colorant fastness on a particular receiver. These data are given in the Tables below.

Atmospheric Contaminants Test

Printed samples were mounted in a darkened chamber maintained at room temperature, with a constant atmosphere containing 5 ppm of Ozone, and at a relative humidity of approximately 50%. The samples were removed after a time period of 24 hours. The results are shown in the Tables below.

High Intensity Simulated Daylight Fading (HID) Test

Samples were mounted in a temperature and humidity controlled chamber where they were subjected to 50 Klux light exposure from a filtered xenon light source, designed to match the spectral characteristics of daylight, for a period of two weeks. The results are shown in the Tables below.

Printing of Test Images Using a Thermal Head

To print using a thermal head, the above prepared inks 1–4, 7 and C-1 to C-3, C-5 were placed into empty Lexmark ink cartridges, No. 15MO120, and fitted into the ink station of a Lexmark Z51® printer. They were printed on to receiving elements 1 and 2 with the results summarized in Tables 2 to 4.

TABLE 2

| Ink | Receiving Element | Atmospheric Contaminants Test (% retained) | | HID, Light Fastness Test (% retained) | |
| --- | --- | --- | --- | --- | --- |
| | | 100% dot coverage | 75% dot coverage | 100% dot coverage | 75% dot coverage |
| C-1 | 1 | 30% | 33% | 86% | 84% |
| C-1 | 2 | 29% | 32% | 79% | 75% |
| 1 | 1 | 98% | 95% | 104% | 101% |
| 1 | 2 | 97% | 97% | 99% | 102% |
| 2 | 1 | 77% | 76% | 94% | 93% |
| 2 | 2 | 72% | 70% | 94% | 89% |

The above results show that on either receiving element, the inventive ink compositions 1 and 2 show considerable improvements in the light fastness and ozone fastness over that of the comparison ink composition.

TABLE 3

| Ink | Receiving Element | Atmospheric Contaminants Test (% retained) | | HID, Light Fastness Test (% retained) | |
| --- | --- | --- | --- | --- | --- |
| | | 100% dot coverage | 75% dot coverage | 100% dot coverage | 75% dot coverage |
| C-1 | 1 | 21% | 23% | 75% | 75% |
| C-1 | 2 | 28% | 29% | 70% | 65% |
| C-2 | 1 | 28% | 29% | 69% | 66% |
| C-2 | 2 | 24% | 28% | 56% | 49% |
| C-3 | 1 | 45% | 47% | 84% | 82% |
| C-3 | 2 | 46% | 47% | 82% | 79% |
| 3 | 1 | 92% | 89% | 98% | 96% |
| 3 | 2 | 94% | 94% | 100% | 97% |
| 4 | 1 | 91% | 93% | 99% | 99% |
| 4 | 2 | 93% | 93% | 98% | 98% |

The above results show that on either receiving element the inventive ink compositions 3 and 4 show considerable improvements in the light fastness and ozone fastness over that of the comparison ink compositions C-1, C-2 and C-3.

TABLE 4

| Ink | Receiving Element | Atmospheric Contaminants Test (% retained) | | HID, Light Fastness Test (% retained) | |
| --- | --- | --- | --- | --- | --- |
| | | 100% dot coverage | 75% dot coverage | 100% dot coverage | 75% dot coverage |
| C-5 | 1 | 16% | 17% | 12% | 15% |
| C-5 | 2 | 21% | 23% | 16% | 20% |
| 7 | 1 | 90% | 91% | 80% | 81% |
| 7 | 2 | 88% | 88% | 95% | 94% |
| 2nd Experiment | | | | | |
| C-5 | 1 | 16% | 20% | 18% | 25% |
| C-5 | 2 | 19% | 28% | 23% | 26% |

TABLE 4-continued

| Ink | Receiving Element | Atmospheric Contaminants Test (% retained) | | HID, Light Fastness Test (% retained) | |
| --- | --- | --- | --- | --- | --- |
| | | 100% dot coverage | 75% dot coverage | 100% dot coverage | 75% dot coverage |
| 7* | 1 | 92% | 93% | 87% | 88% |
| 7* | 2 | 95% | 94% | 87% | 87% |

*ink prepared as for 7) but with water replacing the triethanolamine

The above results show that on either receiving element, the inventive ink composition 7, with or without triethanolamine, shows considerable improvement in stability to fading by both light and by atmospheric contaminants such as ozone over that of the comparison ink composition C-5.

Printing of Test Images Using a Piezo Head

To print using a Piezo head, inks C-4, 5 and 6 were placed in empty ink sachets, the remaining air was removed by bleeding and the sachets were fitted into a bay of the Mutoh 4100® printer. The following results were obtained:

TABLE 4

| Ink | Receiving Element | Atmospheric Contaminants Test (% retained) | | HID, Light Fastness Test (% retained) | |
| --- | --- | --- | --- | --- | --- |
| | | At Maximum Density | At Density = 1 | At Maximum Density | At Density = 1 |
| C-4 | 1 | 24% | 23% | 75% | 71% |
| C-4 | 2 | 25% | 25% | 55% | 55% |
| 5 | 1 | 97% | 92% | 98% | 99% |
| 5 | 2 | 99% | 98% | 99% | 99% |
| 6 | 1 | 88% | 91% | 97% | 97% |
| 6 | 2 | 88% | 88% | 95% | 94% |

The above results show that the inventive inks are better than the comparison ink for both light and ozone fastness.

Physical Nature of the Inventive Colorants in the Inks by Microscopy

Four thermal ink samples (1–3 and C-1 were analyzed by transmission electron microscopy (TEM) in a JEM-2000FX® operating at either 200 or 100 kV accelerating voltage, and by optical microscopy (OM) at magnifications up to 1000× in an Olympus BX30® microscope. For direct microscopy examination of ink formulations, suitable samples were prepared by spreading a small drop of the ink onto a carbon film supported on 200 mesh aluminum TEM grid (SPI Inc., West Chester, Pa. 19381). The complementary observation of ink written onto the receiving elements set forth in the invention was performed using suitable cross-sectioned samples, prepared by cryomicrotomy in a Reichert Ultracut S® microtome, equipped with a Reichert FCS® cryo-temperature attachment and a diamond knife. Small area composition analysis was carried out with Energy Dispersive Spectroscopy (EDS) using a focused electron beam, ~20 nm in diameter. The method used follows the standard analysis technique as outlined in published books (e.g. see "Principles of Analytical Electron Microscopy", Chapters 4 and 5, Edit. D. C. Joy, A. D. Romig, and J. I. Goldstein, Plenum Press, New York, 1989).

For ink 1, TEM analysis revealed the ink contained a non-uniform microstructure consisting mostly of spherically shaped islands, and occasionally, irregularly shaped facetted particulates. The former exhibited uniform contrast in the TEM, indicating that they are amorphous solids, and were found to have the range approximately between 10 and 20 nm. Further, these islands are found to comprise agglomerates of amorphous colorant solids, and as such are larger than the individual colorant particles. The facetted particulates showed black and white contrast indicating crystalline characteristics, and they ranged from ~40 to 100 nm. Both the islands and particulates were found to contain Ni and S by EDS, consistent with the colorant composition. For ink written on receiving element 1, TEM observations revealed a distinct layer of colorant deposited at the surface. At 100% dot coverage using the Lexmark Z51® printer, this layer thickness was approximately 0.1 $\mu$m±0.05 $\mu$m. In a complimentary fashion, optical microscopy showed that the colorant had not significantly penetrated into the receiving elements, but instead is confined as a thin layer at the surface. Taken together, the microstructure and composition data indicate that the ink contains a nanoparticulate dispersion of amorphous and crystalline colorants. These characteristics are distinctly different than those found for the comparison ink composition C-1.

For ink 2, TEM results similar to those of 1 were found. The ink dispersion consisted mostly of spherically shaped islands, and occasionally irregularly shaped facetted particulates. The former exhibited uniform contrast in the TEM, indicating their amorphous nature, and were found to be approximately 10–20 nm in size. Further, these islands are found to comprise agglomerates of amorphous colorant solids, and as such are larger than the individual colorant particles. The latter showed black and white contrast, indicating their crystalline matrix, and ranged in size from approximately 40 to 100 nm. Both the islands and the particulates were found to contain Ni, Cu and S, as analyzed by EDS, consistent with the colorant composition. For ink written on receiving element 1, TEM observations revealed a distinct layer of colorant deposited at the surface. At 100% dot coverage using the Lexmark Z51® printer, this layer thickness was approximately 0.1 $\mu$m±0.05 $\mu$m. In a complimentary fashion, optical microscopy showed that the colorant had not significantly penetrated into the receiving elements, but instead is confined as a thin layer at the surface. Taken together, the microstructure and composition data indicate that the ink contains a nanoparticulate dispersion of amorphous and crystalline colorants. These characteristics are distinctly different than those found for the comparison ink composition C-1.

For ink 3, TEM analysis revealed the ink to exhibit microstructural characteristics similar to those of 1 and 2. It consisted of spherically shaped solid islands, and irregularly shaped facetted particulates. The former exhibited uniform contrast in the TEM, indicative of its amorphous matrix, and was found to have sizes ranging from 10–20 nm. Further, these islands are found to comprise agglomerates of amorphous colorant solids, and as such are larger than the individual colorant particles. The latter showed black and white contrast, indicative of its crystalline matrix, and they ranged from approximately 40 to 100 nm. Both the islands and the particulates were found to contain Cu and S, as analyzed by EDS, consistent with its colorant composition. For ink written on receiving element 1, TEM observations revealed a distinct layer of colorant deposited at the surface. At 100% dot coverage using the Lexmark Z51® printer, this layer thickness was approximately 0.1 $\mu$m±0.05 $\mu$m. In a complimentary fashion, optical microscopy showed that the colorant had not significantly penetrated into the receiving elements, but instead is confined as a thin layer at the surface. Taken together, the microstructure and composition data indicate that the ink contains a nanoparticulate dispersion of amorphous and crystalline colorants. These characteristics are distinctly different than those found for the comparison ink composition C-1.

For ink C-1, when it was spread out and dried on the carbon film, TEM data showed the ink was uniform in morphology, with no discernible microstructure feature. Under the optical microscope, this dried ink exhibited a cyan color and formed a uniform film. When printed on receiving elements 1 and 2, cross-section TEM data revealed no solid deposit at the surface. Cross-section OM observations showed this colorant had significantly penetrated into the receiving elements. These observations are consistent with the characteristics of soluble dye-based inks that can penetrate into the receiving elements after the ink deposition process.

Physical Nature of the Inventive Colorants in the Inks by Centrifugation

Ink samples 3, 4, C-1 and C-3 were used to fill centrifuge tubes and were subjected to centrifugation for 24 h, using a Beckman Ultra Centrifuge® with conditions of 60,000 rpm at 20° C. A 100 $\mu$L sample was taken from the top 5 mm of the centrifuge tube, before and after centrifugation. These were diluted with deionized water using the same dilution factor such that the range of absorbance seen when the visible spectra of the samples taken before centrifugation was within the range of the spectrometer. For each sample, the spectral absorbance maximum between 400 nm and 700 nm was recorded before centrifugation ($D_1$) and compared to the absorbance at that wavelength after centrifugation ($D_2$). The ratio of these values $D_2/D_1$ expressed as a percentage is an indicator of the proportion by weight of the colorant in the ink that exists in solution. The value 100−($D_2/D_1$) % is then an indicator of the proportion by weight of the colorant that is in particulate form. These results are given in Table 6 below.

TABLE 6

| Colorant | Ink | 100-($D_2/D_1$) % |
|---|---|---|
| A | 3 | 86% |
| B | 4 | 83% |
| DB199 | C-1 | 34% |
| Bayscript Cyan BA ™ | C-3 | 50% |

A similar experiment was performed using inventive colorant composition 7 (made from colorant D, with no triethanolamine) and comparison C-5. The results are shown in Table 7 below.

TABLE 7

| Colorant | Ink | 100-(D$_2$/D$_1$) % |
|---|---|---|
| D | 7* | 75% |
| Ex. 2 of U.S. Pat. No. 6,152,968 | C-5 | 21% | ink prepared as for 7) but with water replacing the triethanolamine

The above results show that in the invention ink compositions, the colorants exist predominantly as particles that are capable of sedimentation when centrifuged, which is not the case for the comparison ink compositions.

Although the invention has been described in detail with reference to certain preferred embodiments for the purpose of illustration, it is to be understood that variations and modifications can be made by those skilled in the art without departing from the spirit and scope of the invention.

What is claimed is:

1. An ink jet ink composition comprising water, humectant and a nanoparticulate dispersion that is the product of self-assembling colorant molecules that spontaneously form the nanoparticulate dispersion without any prior physical attrition or prior surface modification, said self-assembling colorant molecules each represented by the formula:

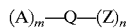

$(A)_m$—Q—$(Z)_n$ wherein:

Q represents a chromophore;

each A independently represents an organic or inorganic non-ionic, hydrophilic group capable of hydrogen bonding or other non-covalent bonding to form the nanoparticulate dispersion;

each Z independently represents an organic or inorganic water-solubilizing group capable of electrostatic bonding to form the nanoparticulate dispersion; and m and n each independently represents an integer from 0 to 10;

with the proviso that n+m is at least 1; and with the further proviso that at least about 50 wt. % of the colorant is present in the composition as particles.

2. The composition of claim 1 wherein said Q represents a colorant selected from the class consisting of anthraquinone, naphthoquinone, quinacridone, quinophthalone, indigo, thioindigo, perylene, dioxazine, 1,4-diketopyrrolopyrrole, anthrapyridine, anthrapyrimidine, anthanthrone, flavanthrone, indanthrone, isoindoline, isoindolinone, perinone, pyranthrone, porphyrin, and azo chromophores.

3. The composition of claim 1 wherein each said Z independently represents sulfonate, sulfinate, phosphonate, carboxylate, ammonium, substituted ammonium, pyridinium, amidinium or guanidinium.

4. The composition of claim 1 wherein each said A independently represents hydroxy, a sugar residue, a polyoxyalkylene group, a sulfamoyl or carbamoyl group and its mono- and di-substituted derivatives, a heterocyclic group or an alkylsulfonyl group.

5. The composition of claim 1 wherein said colorant is present in an amount of from about 0.2 to about 10 wt. %, said humectant is present in an amount of from about 5 to about 70 wt. %, and the balance is water.

6. The composition of claim 1 which also includes a water-soluble dye.

7. The composition of claim 1 wherein said particles are less than about 0.3 μm in size.

8. The composition of claim 1 wherein said particles are less than about 0.1 μm in size.

9. The composition of claim 1 wherein said colorant has the formula:

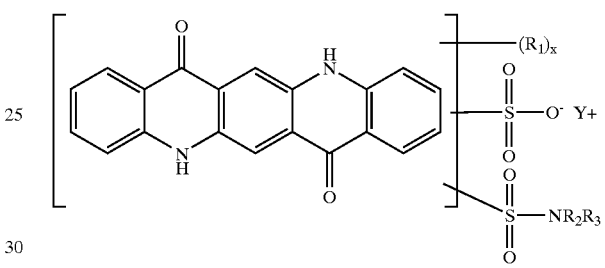

wherein:

each $R_1$ independently represents an alkyl group of from 1 to about 6 carbon atoms, an alkoxy group of from 1 to about 6 carbon atoms, an alkoxycarbonyl group of from 1 to about 6 carbon atoms, halogen, cyano, nitro, carbamoyl, alkylsulfonyl, an alkylcarbamoyl group of from 1 to about 6 carbon atoms or a dialkylcarbamoyl group of from 1 to about 6 carbon atoms;

$R_2$ and $R_3$ each independently represents H or an alkyl group of from 1 to about 6 carbon atoms, optionally substituted with one or more groups selected from the group consisting of hydroxy, amino, dialkylamino, alkoxy, halogen, nitro, cyano, alkoxycabonyl and acyloxy;

$R_2$ and $R_3$ may also be part of a 5- to 7-membered heterocyclic ring;

x represents an integer from 0 to 4; and

Y represents hydrogen, alkali metal or an organic cation.

10. The composition of claim 1 wherein the particles are less than 0.3 μm in size.

11. The composition of claim 1 wherein the particles are less than about 0.1 μm in size.

* * * * *